May 12, 1936.  L. S. CHALATOW  2,040,357
APPARATUS FOR INDICATING THE HEIGHT OF LIQUID IN RECEPTACLES
Filed May 1, 1933
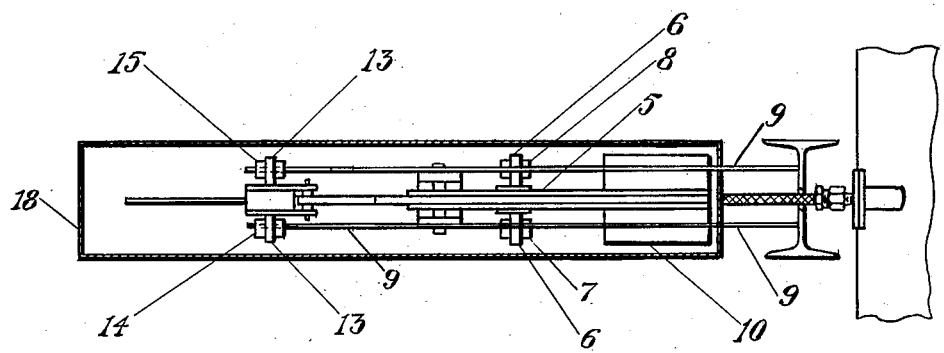
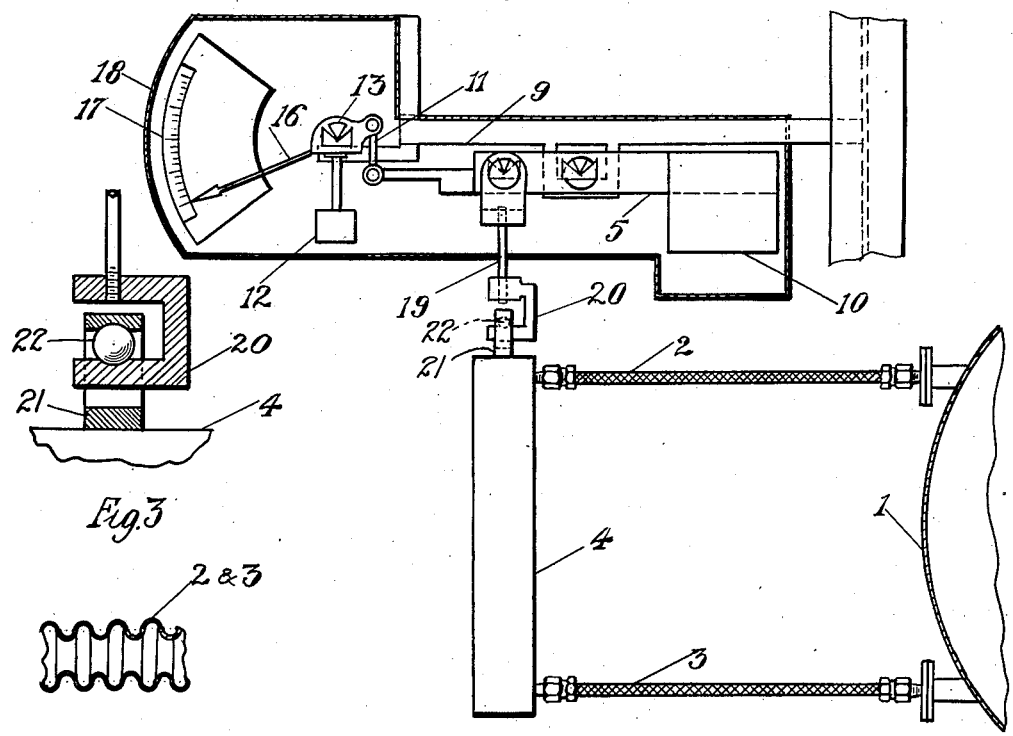
INVENTOR
Leon Sergius Chalatow Patented May 12, 1936

2,040,357

UNITED STATES PATENT OFFICE 2,040,357

APPARATUS FOR INDICATING THE HEIGHT OF LIQUID IN RECEPTACLES

Leon Sergius Chalatow, Boston, Mass., assignor to Philip A. Jerguson, Medford, Mass.

Application May 1, 1933, Serial No. 668,678

1 Claim. (Cl. 73—54)

My present invention relates to improvement in liquid level indicators, that indicate by weighing the liquid, and use a container of a cylindrical or other suitable shape in communication with the liquid receptacle and use a scale mechanism supporting the cylinder and permitting movement of said cylinder in accordance with the weight of liquid therein; and the objects of my improvement are: First—to eliminate the error in indication resulting from the resistance of tubes (connecting the cylinder to the liquid receptacle) to bending, said bending being produced by the movement of the cylinder. Second—to eliminate the error in indication resulting from the thrust exercised by the flexible tubes on the cylinder, said thrust being the result of the stiffening of the tubes under internal pressure. Third—to eliminate the error in indication resulting from the difference of temperatures between the liquid in the receptacle and the liquid in the weighing cylinder or water column.

I attain this object by mechanism illustrated in the accompanying drawing, in which Figure 1 is a plan view of the machine as it appears after the removal of the top of the box.

Figure 2 is a vertical view of the machine as it appears after the removal of the side cover.

Figure 3 is a detailed view of the universal joint, and

Figure 4 is a cross-section view of the flexible tubes connecting the cylinder to the liquid receptacle.

Similar numerals refer to similar parts through several views.

The steam boiler 1 is a cross drum boiler of conventional type.

The gauging instrumentalities comprise a weighing cylinder 4, hanging from a scale beam 5. Said beam has a knife pivot 6 rigidly connected to it and is free to oscillate in agate bearings 7 and 8, said bearings being supported by frame 9. Said frame is connected by suitable means to some structure, for instance, the one supporting the boiler (one half of frame 9, only, is shown in Fig. 2). The weighing cylinder 4 has communication with the interior of the boiler by means of tube 2 and tube 3 connecting it to the water and steam space of the boiler respectively.

Counterweight 10 is attached to one end of the scale beam and link 11 is attached to its opposite end and connects said scale beam to pendulum 12. Pendulum 12 with knife pivot 13 which is rigidly connected to it is free to oscillate in agate bearings 14 and 15, said bearings are supported by frame 9. Indicator 16 is fixed to the pendulum, and dial 17 is attached to the box 18. Said box is supported by frame 9. The rod 19 is attached by means of a pivot to the scale beam 5 and cylinder 4 is attached to said rod through a universal joint. Said universal joint shown in Figure 3 consists of a hook 20 and eye 21 and a ball 22, the ball 22 being placed between the hook 20 and the eye 21. About one-eighth of the ball 22 is inserted in a spherical depression in the hook 20, and one-eighth of the ball 22 at the opposite side is inserted in a spherical depression in the eye 21, to prevent the ball 22 from rolling out.

It will be understood from the description so far that the water supplied to the boiler will flow without restraint through pipe 3 into the weighing cylinder 4, and will rise therein to a certain level, causing the cylinder to descend against the increasing momentum of the pendulum 12. In order to indicate the level of the water in the weighing cylinder, and hence the level of the water in the boiler, the following instrumentalities are used:

Upon the pendulum is arranged an indicating hand 16, and a dial 17 is rigidly connected through the box 18 to the frame 9.

It will be obvious that as the weighing cylinder 4 moves in either direction that this movement is communicated to the scale beam 5 and through the link 11 is communicated to the pendulum 12 and to the indicating hand 16, causing the latter to move upon the dial 17.

As the level of the liquid rises or falls the cylinder will, due to the change in weight, move up or down and this motion will be followed by the bending of the flexible tubes connecting the cylinder to the boiler.

By means of long and elaborate experiments I found that this bending of flexible tubes, if the latter are made of special corrugated inner tubes covered with one or more metallic wire braiding on the outside, offer practically no resistance, provided that the total travel of the moving end of the flexible tube up or down from its horizontal position does not exceed 1/100 of the total length of the flexible portion of the tube.

After the above-mentioned limit is surpassed, the resistance of the tubes to bending decreases the sensitiveness of the apparatus and the indicating hand does not return to its initial position when the liquid does, and the same weights produce different movements of the indicating hand.

By suitably proportioning the parts, such as the distances of the pivot points of the scale beam and pendulum from the point of suspension of the cylinder and by selecting the proper weight for the pendulum and locating it at certain distance from the pivot point of the pendulum, the total travel of the moving end of the flexible tube (resulting from the different position of the weighing cylinder when empty or full) up or down from its horizontal position could be reduced to a distance not exceeding 1/100 of the total length of the flexible portion of each tube.

If this is done the resistance of said tubes to bending (provided these tubes are made of corrugated inner tubes covered with one or more braidings of metallic wire on the outside), will not detrimentally effect the correctness of the indication.

As the water in the weighing receptacle will always be cooler than the water in the boiler the density of the water in the receptacle will be greater than the density of the water in the boiler and it will assume a level somewhat lower than the level of the water in the boiler. By suitably proportioning the parts of the apparatus, such as the distance of the pivot point of the scale beam from the point of suspension of the weighing receptacle, the distance of the pivot point of the pendulum from its center of gravity, the weight of the pendulum and the location of marks on the dial, the apparatus could be made to indicate for a certain specified pressure and temperature in the boiler, the height of water in the boiler and not the height of water in the weighing container. This will eleminate the error in indication resulting from the cooling which takes place between the boiler and the weighing container.

As pressure increases the flexible tubes become more and more rigid and they exercise a thrust on the cylinder in different directions, depending upon the imperfection of alignment, and inequality in the flexibility of the tubes. By using a special type of universal joint, illustrated in Figure 3, the cylinder is permitted to adjust itself to a position that will relieve this thrust and eliminate the error in indication of the liquid level resulting from said thrust.

I am aware that prior to my invention liquid level indicators have been made with weighing receptacles in connection with scale mechanism. I, therefore, do not claim such a combination broadly, but I claim:

In a device of the class described a container having flexible tubular connecting means for placing it in communication with a remote body of liquid to receive from said body a column of liquid, the altitude of which is definitely related to the depth of said body, the container being substantially free to move up and down under gravity by virtue of said connecting means, means for supporting the container comprising a movable counteracting mass adapted to balance the container in all its conditions of fullness, and means for manifesting the position of said mass, said connecting means extending substantially straight and horizontally and being of a length at least about one hundred times the vertical length of the range of movement of the container.

LEON SERGIUS CHALATOW.